United States Patent
Katakura (10) Patent No.: US 6,169,566 B1
(45) Date of Patent: Jan. 2, 2001

(54) NON-IMPACT PRINTER

(75) Inventor: Shinichi Katakura, Tokyo (JP)

(73) Assignee: Oki Data Corporation, Tokyo (JP)

( * ) Notice: Under 35 U.S.C. 154(b), the term of this patent shall be extended for 0 days.

(21) Appl. No.: 09/255,134

(22) Filed: Feb. 19, 1999

(30) Foreign Application Priority Data

Feb. 25, 1998 (JP) .................................................. 10-060487

(51) Int. Cl.$^7$ .................................. B41J 2/47; B41J 2/45; B41J 2/435
(52) U.S. Cl. ............................ 347/240; 347/238; 347/247
(58) Field of Search .................................... 347/240, 237, 347/247

(56) References Cited

U.S. PATENT DOCUMENTS 4,595,948 * 6/1986 Itoh et al. ............................... 358/75

5,892,532 * 4/1999 Katakura et al. .................... 347/240

* cited by examiner

*Primary Examiner*—Thinh Nguyen
(74) *Attorney, Agent, or Firm*—Akin, Gump, Strauss, Hauer & Feld, L.L.P.

(57) ABSTRACT

A non-impact printer include a print head with a plurality of print elements such as light emitting diodes (LEDs). A driver drives the plurality of LEDs in accordance with logical states of corresponding bits of print data. A non-volatile memory stores energy specifying data. The energy specifying data describes an amount of drive energy that should be supplied to each of the plurality of print elements when each of the plurality of LEDs are driven during the printing. A random number generator generates random numbers. An adder adds the random numbers to the values of the energy specifying data to produce the energy specifying data that fluctuates within a predetermined range. Each of the plurality of LEDs is supplied with an amount of drive energy to in accordance with the fluctuating energy specifying data, thereby rendering the variations in print density of an entire image not detectable.

16 Claims, 12 Drawing Sheets

NON-IMPACT PRINTER

BACKGROUND OF THE INVENTION

1. Field of the Invention

The present invention relates to a non-impact printer where non-impact printing is performed by, for example, an electrophotographic method and thermal transfer method.

2. Description of Related Art

An electrophotographic printer incorporates, for example, an LED head having a plurality of light emitting diodes (referred to as "LED" hereinafter) aligned in line. The LED head illuminates the charged surface of a photoconductive drum to form an electrostatic latent image thereon. The electrostatic latent image is then developed with toner into a toner image. The toner image is transferred to print paper and subsequently fixed.

The aforementioned conventional apparatus suffers from the following problem.

The LEDs are driven to emit light in accordance with bit data of the print data. In other words, each LED is driven to emit light if a bit is ON, and not to emit light if the bit is OFF. However, it is to be noted that various factors cause variations of characteristics among LEDs and therefore the light intensity of LEDs is not quite consistent. The variations of intensity of light cause differences in dot size of an electrostatic latent image formed on the photoconductive drum. The differences in dot size in turn result in differences in the size of dot or pixel.

If printed images are characters, the differences in dot size are not quite detectable. In contrast, if printed images are photographs, the differences in dot size cause variations of print density, deteriorating print quality. In order to prevent such variations of print density, there has been developed a method of driving LEDs where LED drivers having matched characteristics are selected and used, thereby supplying substantially the same current to individual LEDs.

This method necessitates the selection of matched LED drivers from among a large number of LED drivers. Various operations are involved including determination of an average drive current. The operations require complex alignment and adjustment and increases manufacturing cost. The method is effective in eliminating variations of the intensity of emitted light resulting from variations of drivers, but does not address the problem of variations of the light-emitting characteristic of LEDs.

SUMMARY OF THE INVENTION

An object of the invention is to provide a print head for use in an electrophotographic printer where no detectable difference in print density is recognized.

A non-impact printer include a plurality of print elements. A driver drives the plurality of print elements in accordance with logical states of corresponding bits of print data. First energy specifying data describes an amount of drive energy that should be supplied to each of the plurality of print elements when each of the plurality of print elements are driven. A drive controller subjects the first energy specifying data to random fluctuation to produce second energy specifying data. The drive energy controller supplies an amount of drive energy to each of the plurality of print elements in accordance with the second energy specifying data.

The drive controller includes a non-volatile memory, a random number generator, and an adder. The non-volatile memory stores the first energy specifying data. The random number generator generates random numbers. The adder adds the random numbers to the first energy specifying data to produce the second energy specifying data.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

The present invention will be described in detail with reference to the accompanying drawings.

<Configuration of the Electrophotographic Printer>

The present invention is applicable to various types of non-impact printers such as electrophotographic printers, thermal printers, and ink jet printers. The invention will be described with respect to an LED head which is used in the electrophotographic printer.

Figure 1:
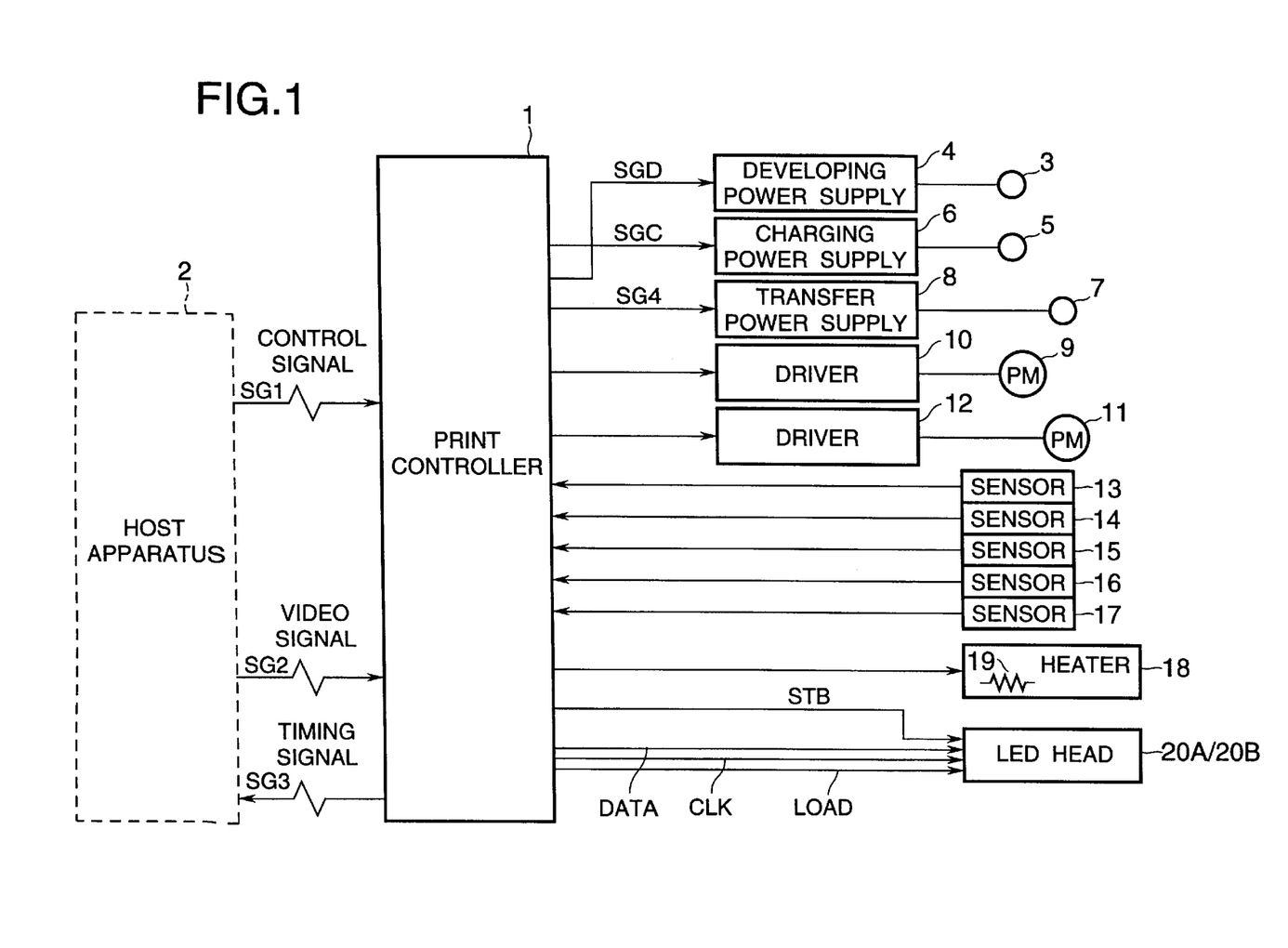
FIG. 1 is a block diagram illustrating a general construction of a controlling section of an electrophotographic printer to which the present invention is applicable.

FIG. 1 is a block diagram illustrating a general construction of a controlling section of an electrophotographic printer as a non-impact printer to which the present invention is applicable.

A print controller 1 controls the overall operation of the electrophotographic printer. The print controller 1 primarily includes a microprocessor, a ROM, a RAM, an I/O port, and a timer. The print controller 1 is connected to a host apparatus 2 such as a personal computer and receives a control signal SG1 and video signal SG2. The controller 1 outputs a timing signal SG3 to the host apparatus 2 and receives the video signal SG2 in timed relation to the timing signal SG3. The print controller 1 is connected to a developing power supply 4 that applies a high voltage to a developing device 3, a charging power supply 6 that applies a high voltage to a charging device 5, and a transfer power supply 8 that applies a high voltage to a transfer device 7. The print controller 1 is also connected to a driver 10 that controls a developing/transferring motor 9 and a driver 12 that controls a paper-feeding motor 11.

The print controller 1 controls the aforementioned power supplies 4, 6, and 8, and the drivers 10 and 12 in a predetermined time sequence.

Provided at various locations in the printer are, for example, a paper entrance sensor 13, a paper exit sensor 14, a remaining paper sensor 15, a paper size sensor 16, and a fixing temperature sensor 17. The outputs of these sensors are fed to the print controller 1. For example, the print controller 1 controls based on the output of the fixing temperature sensor 17 the on-off operation of a heater 19 incorporated in a fixing unit 18. The print controller 1 outputs print data on a line-by-line basis (referred to as "one-line DATA" hereinafter), a clock signal CLK1, a load signal LOAD (referred to as "LOAD" hereinafter), and a strobe signal STB (referred to as "STB" hereinafter) to the LED head 20A/20B to the LED head 20A or 20B so that the LED head 20A or 20B writes an electrostatic latent image on the photoconductive drum.

The operation of the print controller 1 will be described.

Upon receiving the control signal SG1 from the host apparatus 2, the print controller 1 checks the output of the fixing temperature sensor 17 to determine whether the fixing unit 18 is at a temperature necessary for fixing operation. If the temperature is not high enough for the fixing operation, then the print controller 1 turns on the heater 19 to raise the fixing temperature of the fixing unit 18.

Then, the controller 1 causes the driver 10 to start the developing/transferring motor 9 while also outputting a charge signal SGC which turns on the charging power supply 6 so that the charging device 5 starts charging the photoconductive drum. In addition, the print controller 1 outputs a developing bias signal SGD which turns on the developing power supply 4 to apply a predetermined bias voltage to the developing device 3, thereby uniformly charging the toner.

The print controller 1 detects the presence and absence of the print paper on the basis of the output signals of the remaining paper sensor 15 and paper size sensor 16, and then starts transporting the print paper. The driver 12 controls the paper feeding motor 11 to drive a feed roller not shown, in rotation in a forward direction, thereby advancing the print paper to the paper entrance sensor 13. Then, the driver 12 causes a registry motor, not shown, to rotate, and the paper feeding motor 11 to rotate in a reverse direction so that the feed roller is no longer rotated.

The registry motor transports the print paper toward a transfer area where the photoconductive drum is in contact with the transfer device 7. When the print paper passes through the transfer area, the toner image on the photoconductive drum is transferred to the print paper. The print controller 1 edits the video signal SG2 into print data on a page-by-page basis and transfers the print data to the LED head 20A/20B on a line-by-line basis (i.e., one-line DATA). Each of bits of the one-line DATA is attended by the clock CLK1 and serially transferred to the LED head 20A/20B.

<Printing Operation>

Figure 2:
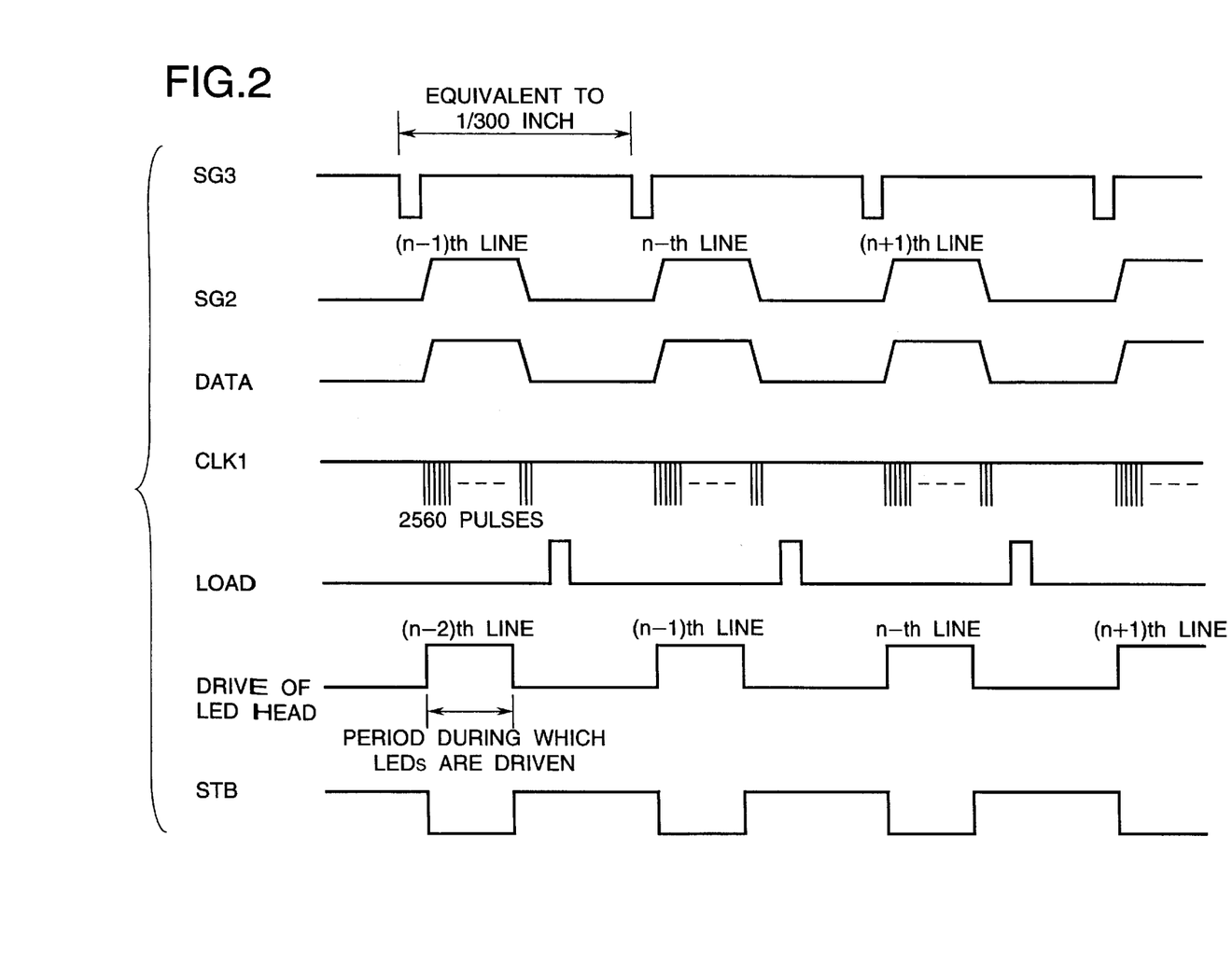
FIG. 2 illustrates the timing chart for the printing operation of the printer of FIG. 1.

FIG. 2 is a timing chart for the printing operation of the printer.

When the print paper reaches the transfer area, the print controller 1 sends the timing signal SG3 to the host apparatus 2.

The timing signal SG3 is a pulse signal that becomes active at predetermined timings when the print controller 1 receives the video signal SG2 on a line-by-line basis. The timing signal SG3 includes signals such as a line timing signal and a raster timing signal. In order to print 300 lines per inch (25.4 mm), one pulse of the timing signal SG3 is sent to the host apparatus 2 every time the photoconductive drum rotates through 1/300 of an inch.

The video signal SG2 is sent from the host apparatus 2 to the print controller 1 in timed relation to the timing signal SG3. The one-line DATA is produced by editing the video signal SG2. The one-line DATA is transferred to the LED head 20A/20B, each bit of the one-line DATA being attended by one of a total of 2560 pulses of the clock CLK1.

After having sent all of the bits of one-line DATA to the LED head 20A/20B, the print controller 1 sends the LOAD to the LED head 20A/20B so that the LED head 20A/20B latches the one-line DATA. Thus, the LED head 20A/20B holds the one-line DATA.

It is to be noted that when the one-line DATA for the n-th line is being received, the LED head 20A/20B is driven by the one-line DATA for the (n-1)th line to emit light.

Then, the print controller 1 sends the signal STB to the LED head 20A/20B, thereby driving the LEDs to emit light in accordance with the logic states of bits of the one-line DATA. In this manner, the LED head 20A/20B illuminates the photoconductive drum to form an electrostatic latent image on the circumferential surface of the photoconductive drum. The electrostatic latent image is subsequently developed with the toner into a toner image by the developing device 3.

The toner image is carried to the transfer device 7 which transfers the toner image to the print paper. The print paper having the toner image thereon is advanced to the fixing unit 18 where the toner image is fused. Then, the print paper is discharged through the paper exit sensor 14 to a stacker, not shown. After the print paper has passed the paper exit sensor 14, the operations of the respective sections of the apparatus complete.

<Construction of LED head 20A>

Figure 3:
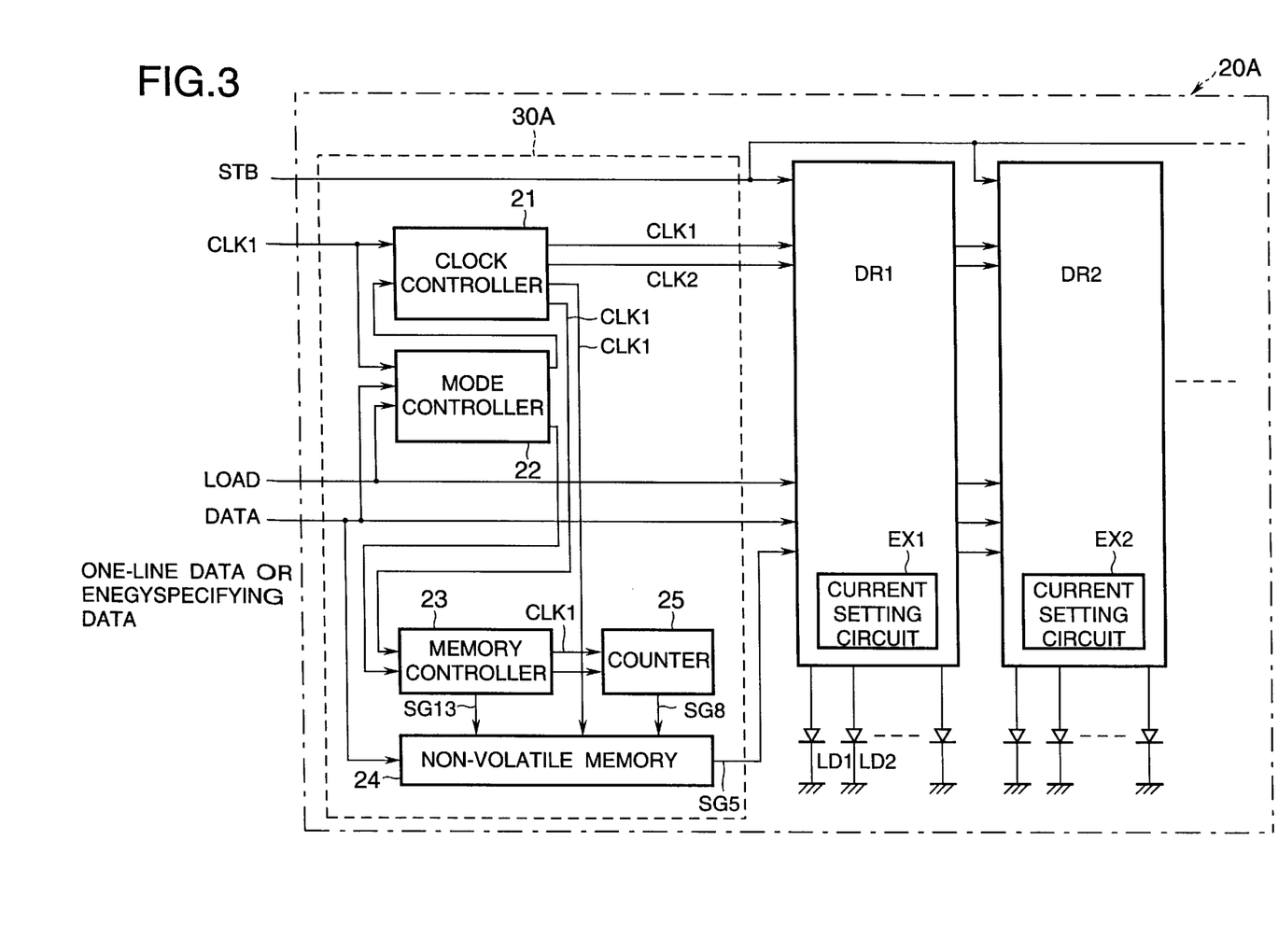
FIG. 3 is a block diagram of an LED head 20A according to the invention.

FIG. 3 is a block diagram of an LED head 20A according to the invention.

Referring to FIG. 3, DR1, DR2, . . . denote blocks in which a plurality of driving circuits are incorporated. Each block incorporates a current setting circuit EX that sets currents through the LEDs in accordance with energy specifying data SG5, so that the intensity of light emitted from the LEDs is substantially the same. In the specification, the term "energy specifying data" is used to represent a current that should be supplied to a corresponding LED. The drive controller 30A outputs the one-line DATA to drivers DR1, DR2, . . . and the energy specifying data SG5 to current setting circuits EX1, EX2, . . . .

The drive controller 30A includes a clock controller 21, a mode controller 22, a memory controller 23, a non-volatile memory 24, and a counter 25. These circuits communicate with one another when receiving the energy specifying data SG5 from the host apparatus, storing the energy specifying data into the non-volatile memory 24, and receiving the one-line DATA from the print controller, and directing the one-line DATA to the drivers DR1, DR2, . . . .

The clock controller 21 receives the clock CLK1 from the print controller 1 and supplies the clock CLK1 to the driver DR1, DR2, . . . , memory controller 23, and non-volatile memory 24. The energy specifying data SG5 is stored into the non-volatile memory 24 when the LED head 20A is manufactured. The mode controller 22 performs a necessary mode-switching operation when storing the energy specifying data into the memory 24. In other words, when the drive controller 30A receives the energy specifying data SG5 from an external circuit (e.g., computer), the mode controller 22 transfers the energy specifying data SG5 to the non-volatile memory 24. When performing a normal printing operation, the mode controller 22 receives the one-line DATA from the print controller 1 and transfers the one-line DATA to the drivers DR1, DR2, . . . .

The memory controller 23 controls the write operation of the energy specifying data SG5 into the non-volatile memory 24.

If the invention is applied to an ink jet printer, the energy specifying data is determined in accordance with the variations in the ink drop size of ejected ink drop so that the energy specifying data compensates for the variations in the characteristics of the ink pressure chambers to ensure printed dots of substantially the same size.

If the invention is applied to a thermal printer, the energy specifying data is determined in accordance with the variations in the size of heat spot so that the energy specifying data compensates for the variations in the characteristics of the heater elements to ensure printed dots of substantially the same size.

<Storing Energy specifying Data>

The operation of storing the energy specifying data into the non-volatile memory 24 of the drive controller 30A will be described.

The mode controller 22 activates the memory controller 23 and instructs the clock controller 21 to output clock CLK1 to the memory controller 23 and non-volatile memory 24. The energy specifying data SG5 is input to the drive controller 30A over the same signal line as the one-line DATA.

The memory controller 23 activates the counter 25 and sends clock CLK1 to the counter 25. In response to the clock CLK1, the counter 25 outputs write addresses to the non-volatile memory 24, so that the energy specifying data SG5 is written into the specified addresses. Every time the counter 25 outputs an incremented address, energy specifying data for a corresponding LED is serially input into the non-volatile memory 24.

The memory controller 23 provides the timings SG13 at which the energy specifying data SG5 is stored into the non-volatile memory 24.

Upon completion of the write operation of the energy specifying data SG5, the mode controller 22 causes the memory controller 23 to stop and the clock controller 21 to stop sending clocks CLK1 to the memory controller 23 and nonvolatile memory 24.

<Current Setting Circuit>

Figure 4:
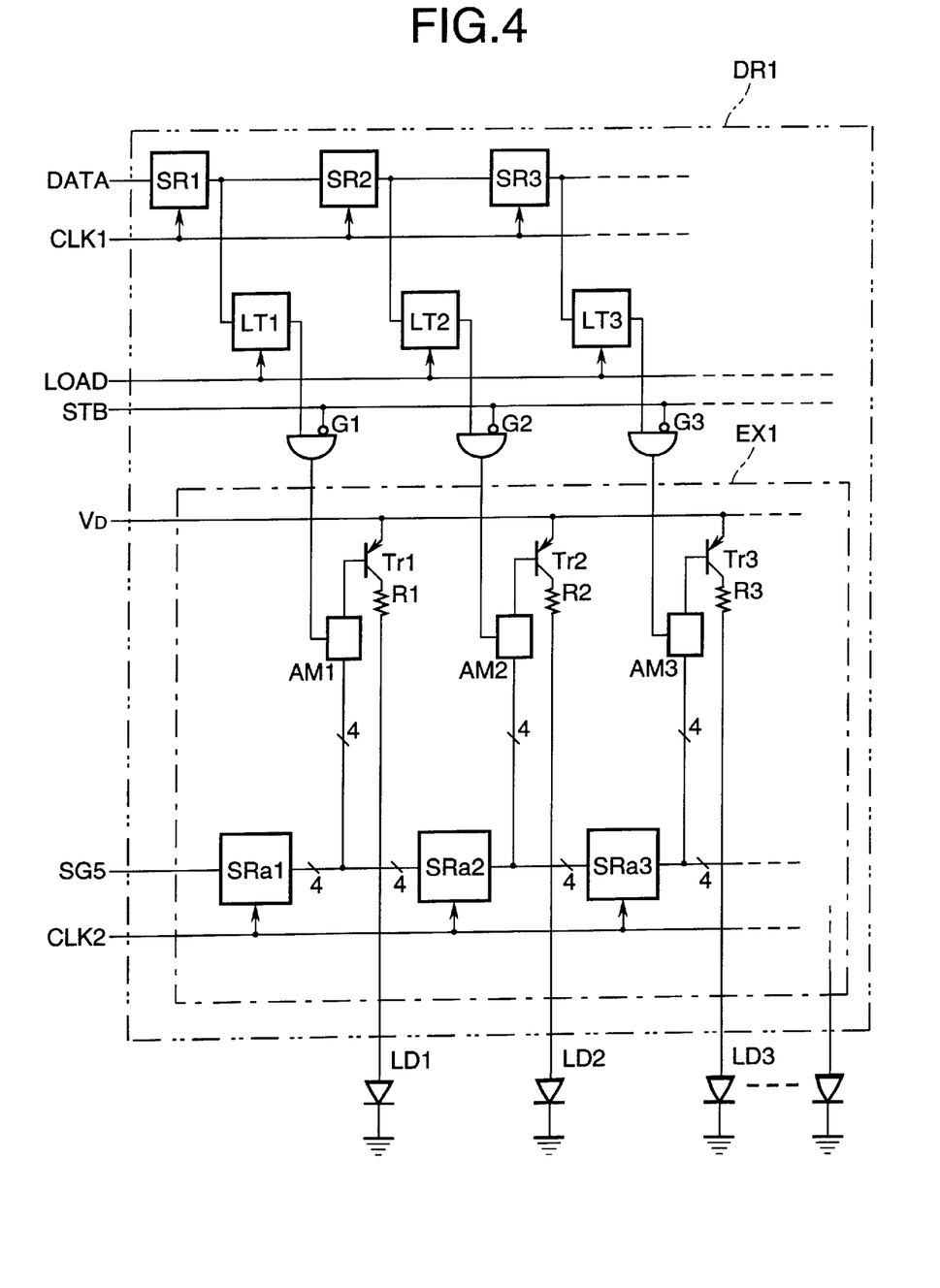
FIG. 4 illustrates an electrical circuit of the current setting circuit EX1 and surrounding circuits of driver DR1 of FIG. 3.

FIG. 4 illustrates an electrical circuit of the current setting circuit EX1 and surrounding circuits.

The drivers DR1, DR2, . . . include shift registers SR1, SR2, SR3, . . . , latches LT1, LT2, LT3, . . . , driver gates G1, G2, G3, . . . , switching transistors Tr1, Tr2, Tr3, . . . , LEDs LD1, LD2, LD3, . . . , and protective resistors R1, R2, R3, . . . .

The shift registers SR1, SR2, SR3,—are serially connected so that the bits of the one-line DATA are serially transferred through the shift registers to drivers DR1, DR2, . . . upon the clock CLK1. The latches LT1, LT2, . . . receive the bit data from corresponding shift registers SR1, SR2, . . . on the LOAD, and then latch the bit data.

The STB opens the gates G1, G2, G3, . . . so that each gate passes corresponding bit data of the one-line DATA that has been stored in the latches LT1, LT2, LT3, . . . . The high logic levels of the bit data passing through the gates G1, G2, G3 . . . drive corresponding transistors Tr1, Tr2, Tr3, . . . to turn on, so that the corresponding LEDs LD1, LD2, LD3, . . . are energized to emit light in accordance with the logical state of the bit data.

The LEDs are replaced by heat-generating elements if the present invention is applied to a thermal printer, and by ink pressure chambers if the invention is applied to an ink jet printer.

Variations in the intensity of light emitted from the LEDs LD1, LD2, . . . are due to the variations in drive current, the characteristic of the transistors Tr1, Tr2, Tr3, . . . , the characteristic of the LEDs LD1, LD2, LD3, . . . , and the characteristics of optical systems such as lens.

Thus, the intensity of light emitted from each of the LEDs LD1, LD2, LD3, . . . is measured when the LED head 20A is manufactured. Then, energy specifying data SG5 is determined to compensate for the variations in the intensity of light, so that the LEDs emit light of substantially the same intensity when they are driven by the energy specifying data SG5. Thus, the energy specifying data SG5 compensates for not only the variations in the characteristics of the LED drivers and LEDs but also the characteristics of rod lens array, not shown. In the present embodiment, the energy specifying data SG5 represents a current that should be supplied to a corresponding LED.

The shift registers SRa1, SRa2, SRa3, . . . hold the energy specifying data SG5 outputted from the non-volatile memory 24. The energy specifying data SG5 is of, for example, a 4-bit value, and therefore four bits are held in each shift register. The energy specifying data SG5 is serially transferred through the shift registers SRa1, SRa2, . . . , advancing one step with each clock pulse of the clock CLK2.

For example, energy specifying data SG5 for the n-th line is transferred to the shift registers SRa1, SRa2, SRa3, . . . before the LEDs are selectively energized for the n-th line. The transistor Tr1 that drives the LD1 has an emitter connected to a power supply voltage VD, a collector connected to the LD1 via the protective resistor R1, and a base connected to the gate G1 via an amplifier AM1. The amplifier AM1 is controlled by the output of the shift register SRa1.

Figure 5:
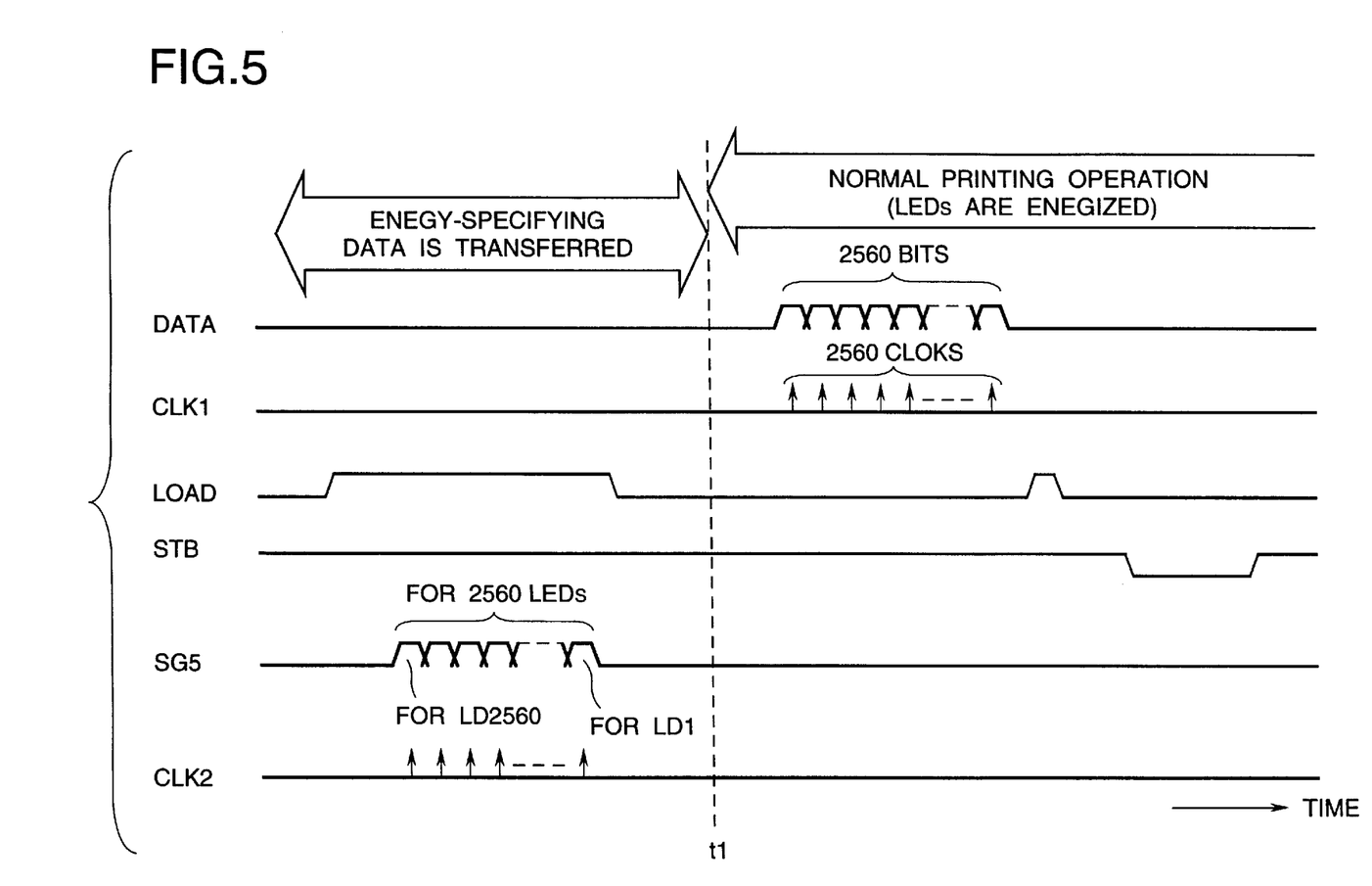
FIG. 5 is a timing chart illustrating the operation of the LED head 20A of FIG. 3.

FIG. 5 is a timing chart illustrating the operation of the LED head 20A of the above-described configuration.

A time duration before time t1 is a period shortly after power-up of the printer during which the energy specifying data SG5 is read from the non-volatile memory 24 and set in the shift registers SRa1, SRa2, . . . A duration after time t1 is a period during which a normal printing is performed and the LEDs are energized in accordance with the one-line DATA.

Upon clock CLK2 supplied to the shift registers SRa1, SRa2, . . . , the bits of the energy specifying data SG5 for 2560 LEDs are serially transferred through the shift registers SRa1, SRa2, . . . .

Since the LEDs are arranged from left to right in the order of LD1, LD2, LD3, . . . as shown in FIG. 4, energy specifying data for LD2560 is first transferred and then energy specifying data for LD2559, LD2558, and soon. When the energy specifying data SG5 for all of the LEDs has been transferred and held on the corresponding shift registers, the transfer of energy specifying data SG5 completes. The shift registers SRa1, SRa2, . . . hold the energy specifying data SG5 until the printer is turned off.

Immediately after time t1, the transfer of the one-line DATA is initiated. The one-line DATA is transferred on the clock CLK1. The operation after time t1 is repeatedly performed whenever a printing operation is performed until the printer is turned off. The other signals have been described previously with reference to FIG. 2 and therefore description thereof is omitted.

<Amplifier AM>

Figure 6:
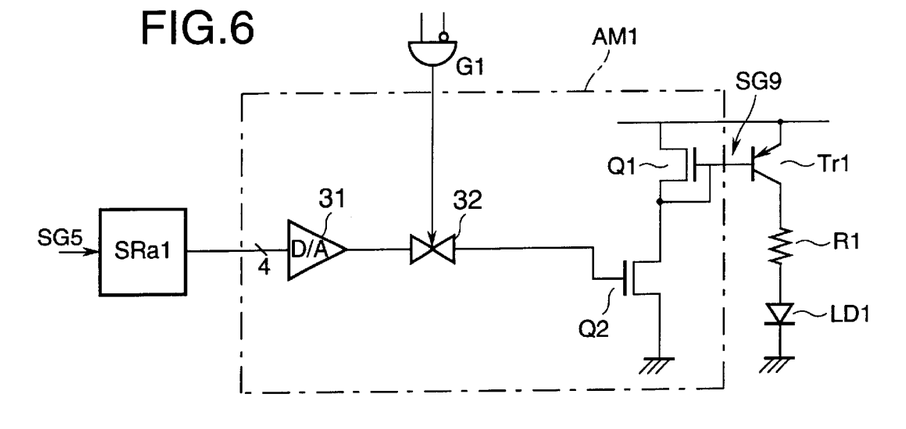
FIG. 6 illustrates an electrical circuit of the amplifier AM1 of FIG. 4.

FIG. 6 illustrates an electrical circuit of the amplifier AM1 of FIG. 4.

The shift register SRa1 holds energy specifying data of a 4-bit digital value. The 4-bit digital value is converted by a D/A converter 31 into an analog signal which in turn is fed to an analog switch 32. The analog switch 32 is opened and closed by the output of the gate G1. The output of the analog switch 32 is amplified by transistors Q1 and Q2.

The output of the amplifier AM1 is determined by a value of the energy specifying data SG5 and fed to the base of the transistor Tr1, thereby setting a current that should be supplied to the LED LD1. The transistor Tr1 supplies the current specified by the energy specifying data to the LD1.

Figure 7A:
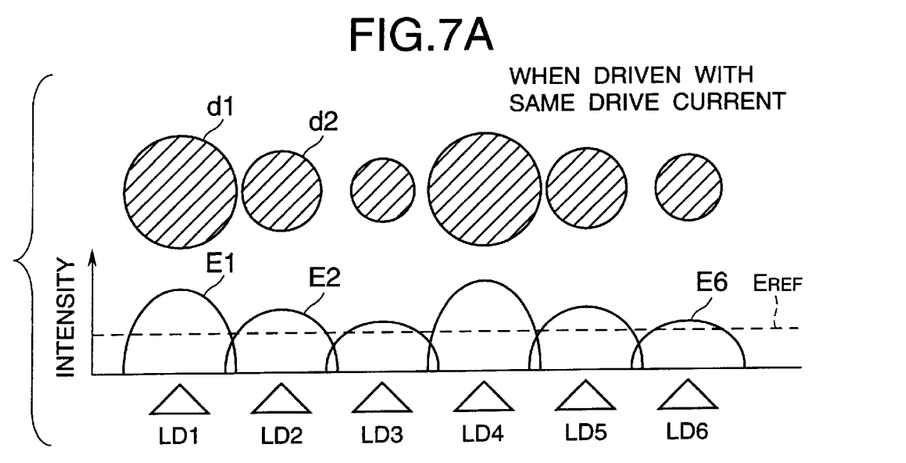
FIGS. 7A and 7B illustrate the intensity of light emitted from the LEDs, FIG. 7A showing the intensity of LD1, LD2, . . . when driven with the same drive current, and FIG. 7B showing the intensity of LD1, LD2, . . . when driven with energy specifying data SG5.
Figure 7B:
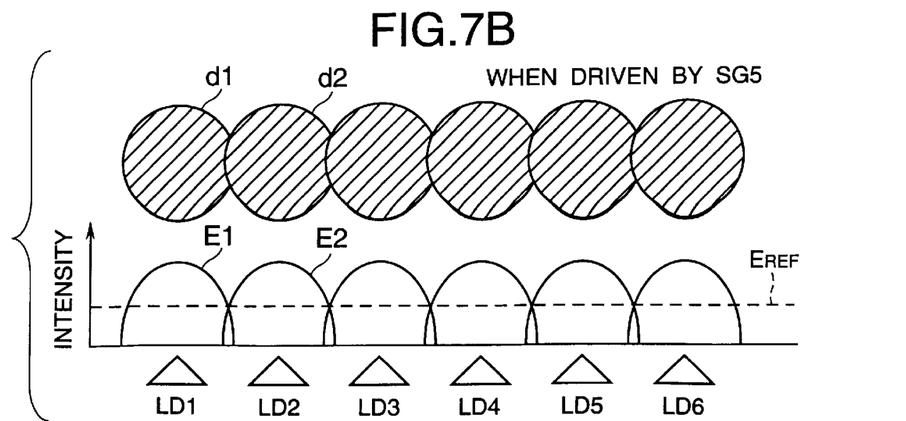

FIGS. 7A and 7B are profiles of distribution of intensity illustrating the intensity of light emitted from the individual LEDs.

FIGS. 7A and 7B plot distance in the direction of a row of LD1, LD2, LD3, as the abscissa and intensity of light emitted from the LD1, LD2, LD3, . . . as the ordinate.

Referring to FIGS. 7A and 7B, the individual LEDs LD1, LD2, . . . emit light having intensity distributions El, E2, . . . , respectively, in the shape of a generally semicircular pattern and form dots of light (e.g., d1 and d2) when seen from above. The dots represent pixels of an electrostatic latent image formed on the photoconductive drum when the LED head 20A illuminates the surface of the photoconductive drum.

FIG. 7A shows the intensity of the LEDs LD1, LD2, . . . if the LEDs are driven with the same drive current. FIG. 7B shows the intensity of the LEDs LD1, LD2, . . . when the LEDs are driven with currents specified by corresponding energy specifying data SG5. FIG. 7B shows that the dots are of substantially the same size. T his is because the values of the energy specifying data SG5 describes different currents th at accommodate variations of characteristics of LEDs, driving circuits, and optical systems.

As mentioned above, driving the individual LEDs with corresponding energy specifying data provides light spots of substantially the same diameter (i.e., intensity), allowing dots of the uniform size to be printed.

If the invention is applied to a thermal printer, the heat spots are generated instead of light spots. If the invention is applied to an ink jet printer, the ink drops are ejected in stead of light spots in accordance with drive voltages applied to the ink chamber walls of the ink jet print head.

<Improved Amplifier AM>

An improvement of the amplifier AM1 of FIG. 6 will be described.

The values of the energy specifying data SG5 are 4-bit digital values which are different from one another by an integer multiple of a predetermined minimum amount. This minimum amount is the "resolution" of the energy specifying data G5. Therefore, the analog outputs of the D/A converters 31 for individual LEDs are also different by an integer multiple of a predetermined amount. In other words, the drive current differs from LED to LED by an integer multiple of a predetermined minimum amount. The stepwise difference in drive current may cause significant variations in the intensity of light if the resolution of energy specifying data SG5 is not high enough. In other words, the energy specifying data SG5 should have values of as small an increment as possible.

Figure 8:
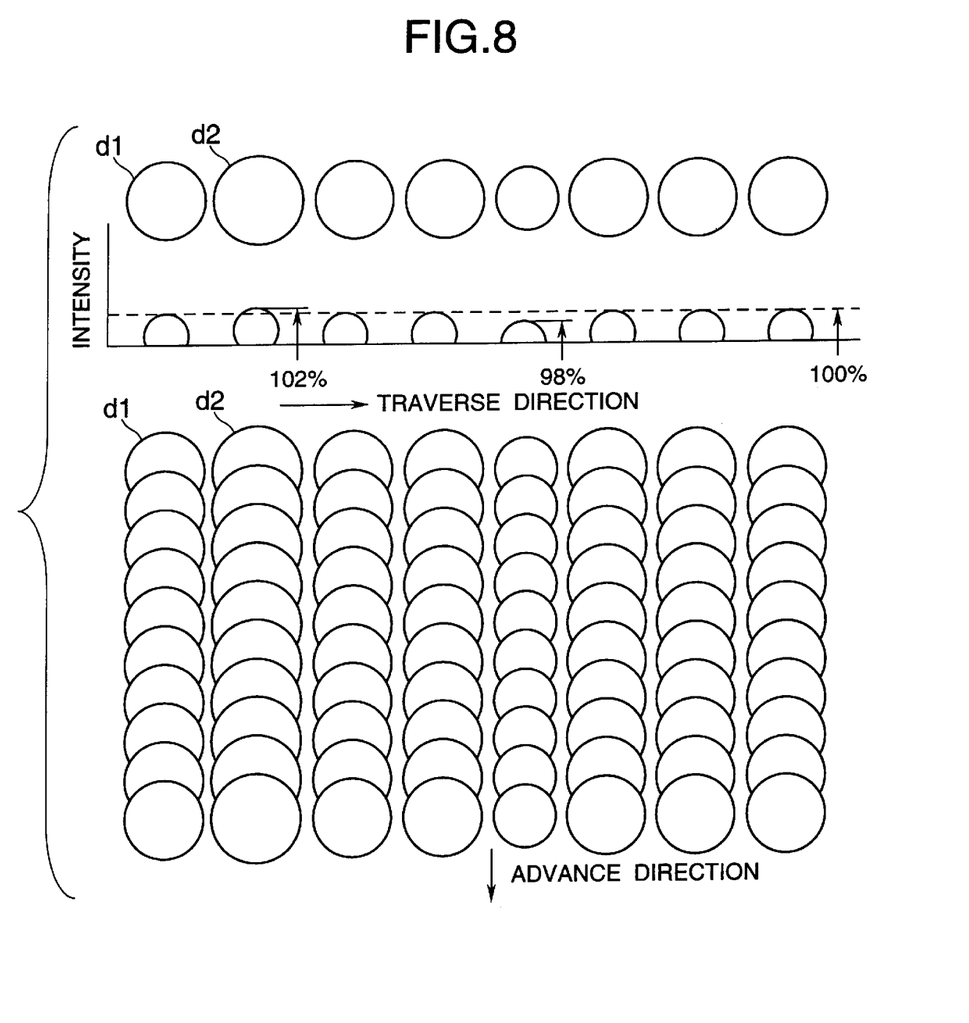
FIG. 8 illustrates the effect of the difference in the resolution of the energy specifying data.

FIG. 8 illustrates the effect of the differences in value of the energy specifying data. FIG. 8 plots distance in the direction of a row of LEDs as the abscissa and intensity of light emitted from the LEDs as the ordinate. A row of circles of different sizes depicted above the LEDs illustrates dots formed by the LEDs on the photoconductive drum. When the LEDs illuminate the surface on the photoconductive drum as the photoconductive drum rotates, the resulting dots on the photoconductive drum are those shown on the lower half of FIG. 8, the dots being aligned both in the traverse direction and in the advance direction.

The energy specifying data SG5 that drive the LEDs in FIG. 8 has three levels of value. In other words, the values are 98%, 100%, and 102% of a value of the energy specifying data required for an optimum intensity of light. This implies that the resolution of the energy specifying data SG5 is 2%. Thus, the light emitted from individual LEDs vary in intensity within a range of 100±2% when the LEDs are driven by the energy specifying data SG5 having a resolution of 2%. For example, FIG. 8 shows dots having intensities corresponding to 100%, 98%, or 102% of the energy specifying data required for the optimum intensity of light.

Therefore, the dots aligned in the traverse direction (perpendicular to a direction of travel of print paper) show some variations of intensity. The dots in FIG. 8 are shown by bringing them together much closer in the advance direction than they actually are so that the difference in diameter can be recognized easily. The light emitted from the LEDs transmits through a plurality of lenses to form their images on the photoconductive drum. The slight reflection and diffraction are apt to occur at the boundaries between lenses, resulting in slight offset of the focused images from where they should be. Thus, even if the spots of light emitted from the LEDs have substantially the same intensity, there may be some variations in the size of dots formed on the surface of the photoconductive drum.

Such variations in intensity cause thinner lines or thicker lines depending on the intensity of light, if the same LEDs are energized to form a line in the advance direction (a direction of travel of the print paper). In addition, a printed image has areas having differences in density which can be detected with naked eyes if the image is formed with gradation by dispersing the dots in an attempt to form an image of substantially the same density in its entirety.

Therefore, the values of energy specifying data SG5 are subjected to random fluctuation within a limited range as described later, so that the dot diameters are averaged out in effect. In other words, LEDs are driven by values of the energy specifying data having limited random errors so as to create variations in dot diameter on purpose. Therefore, diameters of all the LEDs vary from line to line, with the result that dot diameters are averaged in effect and therefore variations in dot diameter are not noticeable.

Such random fluctuation may be generated by adding random numbers to the respective values of energy specifying data SG5.

<Construction of LED Head 20B With Random Number Generator>

Figure 9:
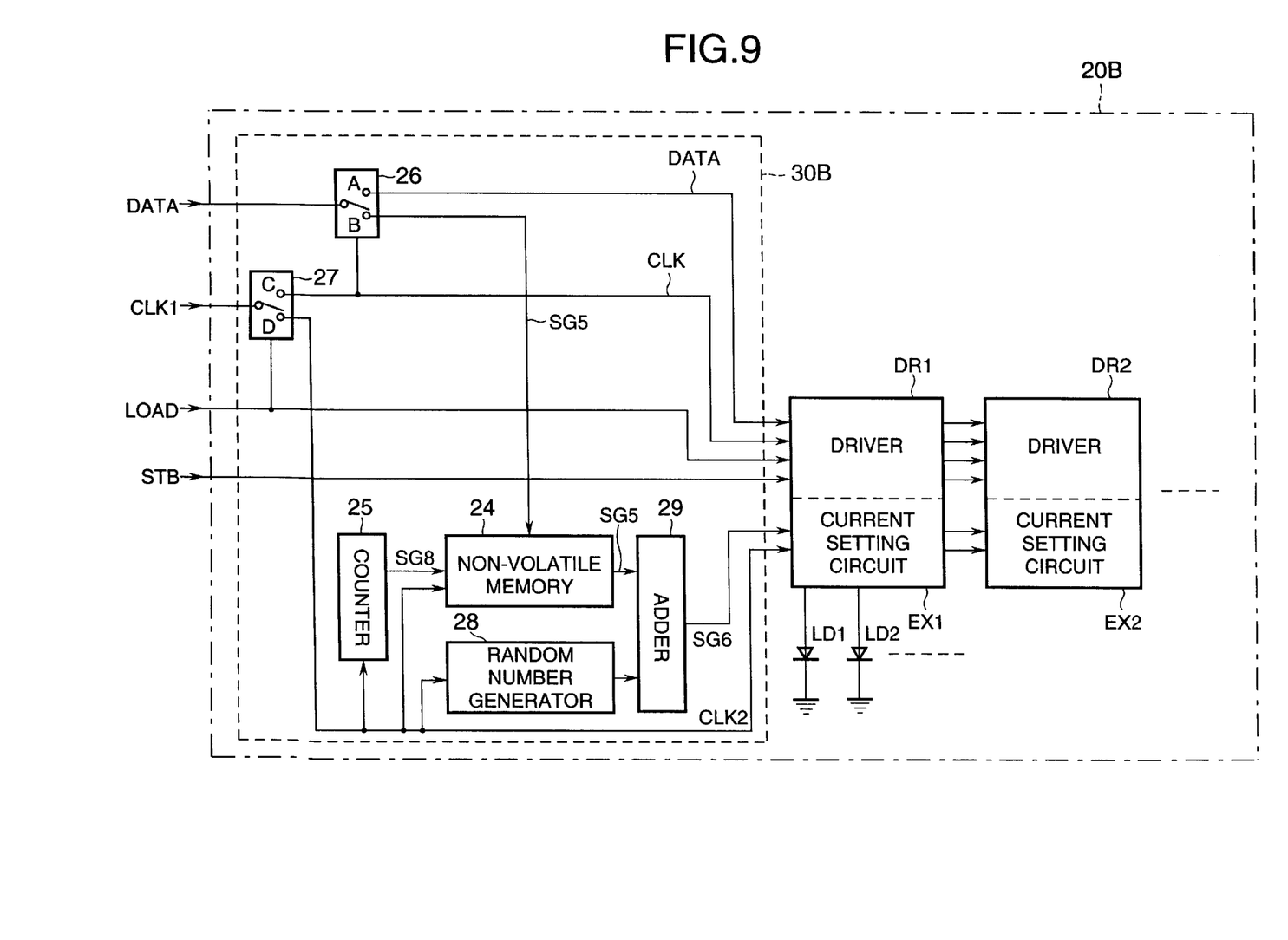
FIG. 9 is a block diagram illustrating an LED head according to the invention.

FIG. 9 is a block diagram illustrating an LED head 20B according to the present invention. The LED head 20B incorporates a means for adding random numbers to the values of energy specifying data SG5.

Referring to FIG. 9, the construction of the LED head 20B will now be described.

The drive controller 30B includes a selectors 26 and 27, a non-volatile memory 24, a counter 25, a random number generator 28, and an adder 29. The selector 26 directs the one-line DATA received from the print controller 1 to the drivers DR1, DR2, DR3, . . . when switched to position A, and directs the energy specifying data to the non-volatile memory 24 when switched to position B.

The selector 27 directs the clock CLK1 to the counter 25, non-volatile memory 24, and random number generator 28, etc., when switched to position D and directs the clock CLK1 to the drivers DR1, DR2, . . . when switched to position C. For example, the selectors 26 and 27 are switched to positions B and D, respectively, on the high level of the LOAD so that the energy specifying data SG5 is directed to the non-volatile memory 24 and clock CLK1 to the counter 25 and random number generator 28, etc. When the selectors 26 and 27 are switched to position B and position D, respectively, the non-volatile memory 24 receives and stores the energy specifying data SG5 for all LEDs in the manner described with reference to FIG. 5. In this manner, all the energy specifying data SG5 is stored in the non-volatile memory 24 before the printer is shipped out from the factory.

When a printing operation starts, the energy specifying data SG5 stored in the non-volatile memory 24 is outputted to the adder 29, which adds the random numbers generated by the random number generator 28 to the energy specifying data SG5. The random numbers are added to the energy specifying data SG5 if the random numbers are positive and are subtracted if negative. Thus, the outputs of the adder 29 fluctuate within a range corresponding to the range in which the random numbers vary, and are transferred to the current setting circuits EX1, Ex2, . . . every time one-line DATA is printed.

When the LOAD goes high, the selector 27 is switched to position D, so that the counter 25 starts counting to output addresses to the non-volatile memory 24 and random number generator 28 provides random numbers to the adder 29. The adder 29 in turn outputs energy specifying data SG6 with fluctuation to the drivers DR1, DR2, . . . . The energy specifying data SG6 is held in the shift registers in the current setting circuits. When all the values of the energy specifying data SG6 have been outputted to the drivers DR1, DR2, . . . , the LOAD goes low so that the selector 27 now directs the clock CLK1 to the drivers DR1, DR2, . . . . Each bit of the one-line DATA is transferred to the drivers DR1, DR2, . . . on the clock CLK1.

<Modifying Energy Specifying Data Using Random Numbers>

Figure 10:
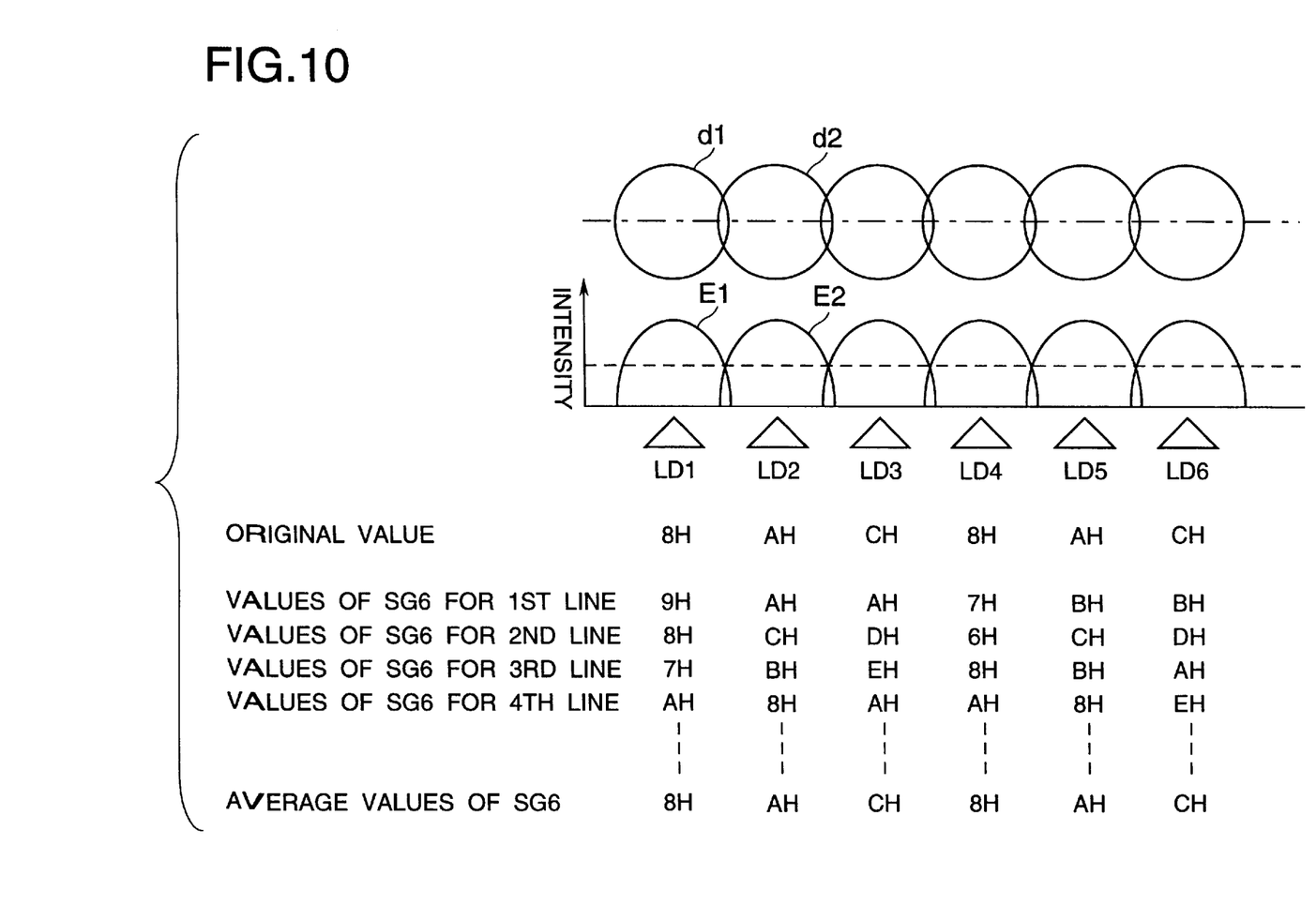
FIG. 10 illustrates a method for modifying the energy specifying data by using random numbers.

FIG. 10 illustrates a method for modifying the energy specifying data SG5 into energy specifying data SG6 by using random numbers. The profiles of intensity of the light emitted from LEDs LD1, LD2, . . . and corresponding dots d1, d2, . . . are shown on the upper part of FIG. 10. The intensity of light of each light emitting diode is determined by a drive current specified by values of the energy specifying data SG6, e.g., 8H, AH, CH, 8H, AH, CH, . . . , expressed in hexadecimal.

The random numbers are generated on a line-by-line basis and added to the energy specifying data SG5 for corresponding LEDs LD1, LD2, . . . . For example, one set of random numbers is generated and added to the energy specifying data SG5 for the first line, then another set of random numbers is generated and added to the energy specifying data SG5 for the second line, then still another set of random numbers is generated and added to the energy specifying data SG5 for the third line, . . . , etc. The average values of the energy specifying data SG6 are 8H, AH, CH, 8H, AH, CH, . . . for LD1, LD2, LD3, LD4, LD5, LD6, . . . , which are the same as the values of the energy specifying data SG5 before having been given fluctuation. This is what is expected since the values of the generated random numbers are distributed uniformly between 98% and 102%.

The values of random numbers should vary over a range that accommodates at least the changes in the value of the energy specifying data SG5 (e.g., ±2% in the present invention). The random numbers should include both positive and negative values. If the dot diameters are fluctuated over a range wider than the range in which the values of the energy specifying data SG5 change, differences in dot diameter between adjacent LEDs due to the variations (i.e., resolution) of the values of the energy specifying data SG5 will be sufficiently absorbed, so that the differences in dot diameter are not detectable in a printed image.

Figure 11:
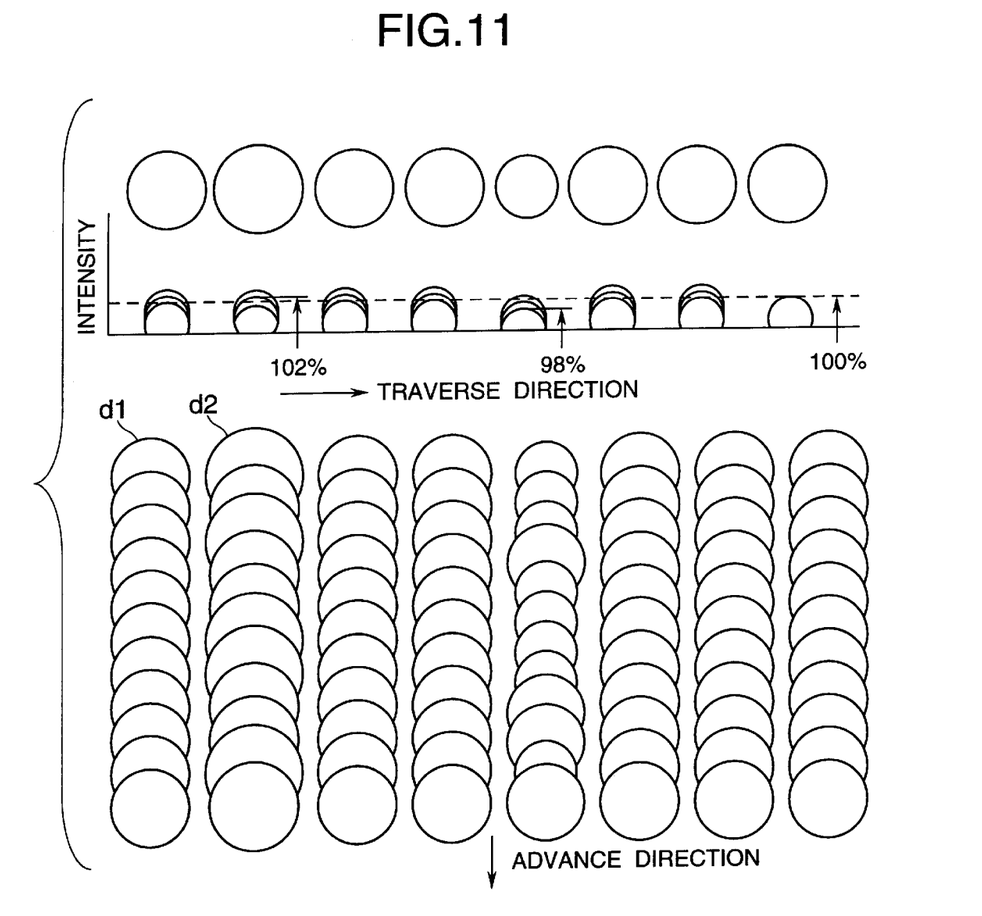
FIG. 11 illustrates the intensity of light emitted from LEDs driven with energy specifying data SG6 which has been added random numbers.

FIG. 11 illustrates the intensity of light emitted from the LEDs driven with the energy specifying data SG6 which has been added random numbers. FIG. 11 plots distance in the direction of a row of LEDs as the abscissa and intensity of light emitted from the LEDs as the ordinate. A row of circles of different sizes depicted above the LEDs illustrates dots formed by the LEDs on the photoconductive drum.

As is clear from FIG. 11, variations in dot size are equally distributed both in the traverse direction and in the advance direction, so that differences in diameter among the dots are not noticeable and thus the entire printed image is of substantially the same density. The dots are shown by bringing them together much closer in the traverse direction than they actually are so that the difference in diameter can be recognized easily.

It is ideal that all the dots are subjected to random fluctuation. However, even if the energy specifying data SG5 is subjected to fluctuation only every other dot or every several dots, the sufficient effect can still be obtained. Subjecting all the dots in all the lines to fluctuation may decrease printing speed and therefore fluctuation of the energy specifying data may be performed only every several lines. Further, a hardware configuration may be implemented to eliminate the need for fluctuating the value of the energy specifying data every other line.

<Modification of Hardware>

Figure 12:
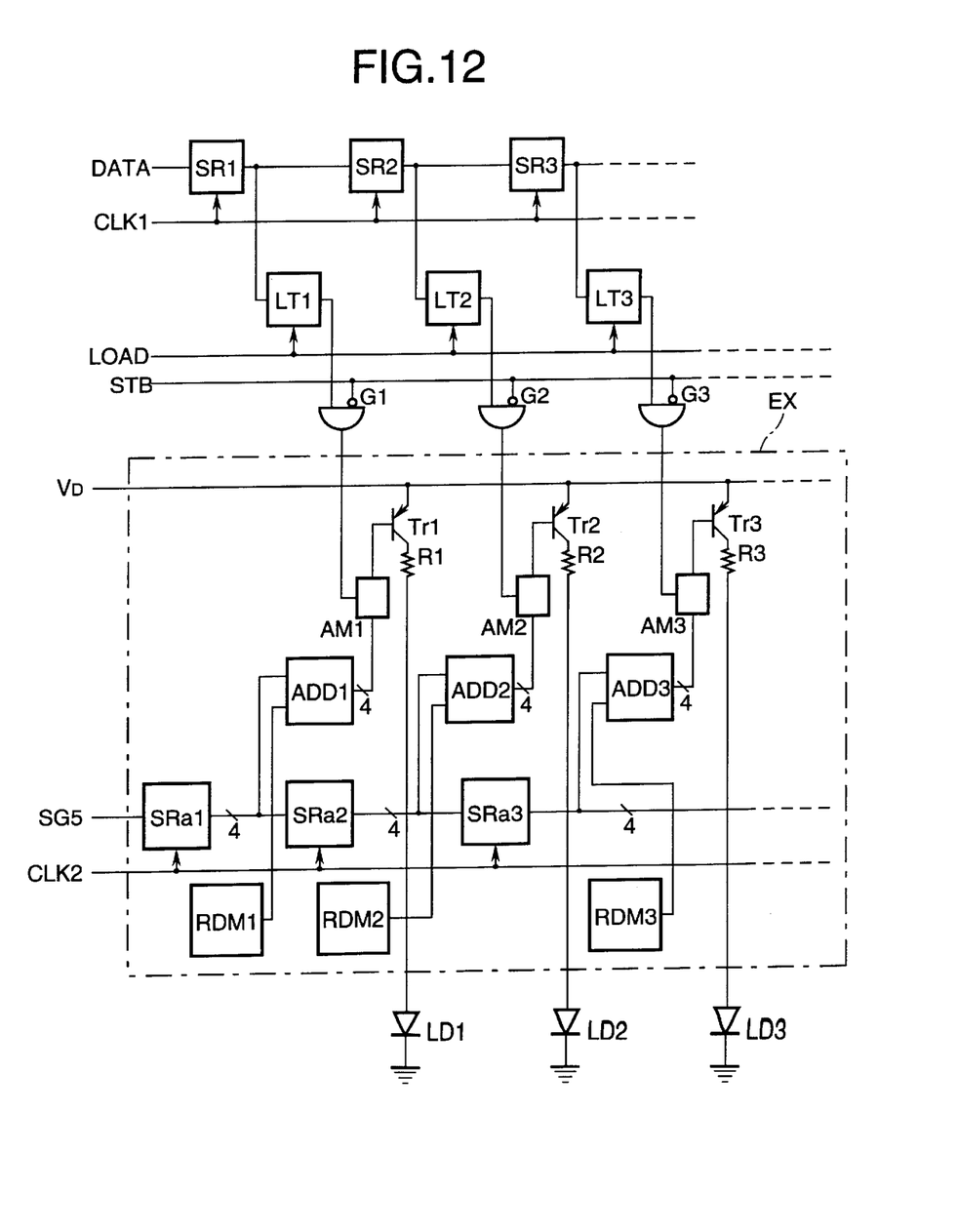
FIG. 12 illustrates an electrical circuit of a modified current setting circuit EX1 and surrounding circuits of the driver DR1.

FIG. 12 illustrates an electrical circuit of a modified current setting circuit EX1 and surrounding circuits of the driver DR1.

The current setting circuit EX1 differs from the aforementioned circuit of FIG. 4 in that there are provided random number generators RDM1, RDM2, . . . for LEDs LD1, LD2, . . . , respectively.

For example, the random number generator RDM1 generates a random number to be added to the energy specifying data SG5 for LD1. The shift register SRa1 holds the energy specifying data SG5 before the random numbers are added thereto.

An adder ADD1 receives the outputs of the shift register SRa1 and the random number generator RDM1 and adds the random number to the energy specifying data SG5. Then, the adder ADD1 provides an output to the amplifier AM1.

The random number generator RDM1 generates a random number for every other line so that the intensity of light emitted from the LD1 is subjected to fluctuation every other line.

Figure 13:
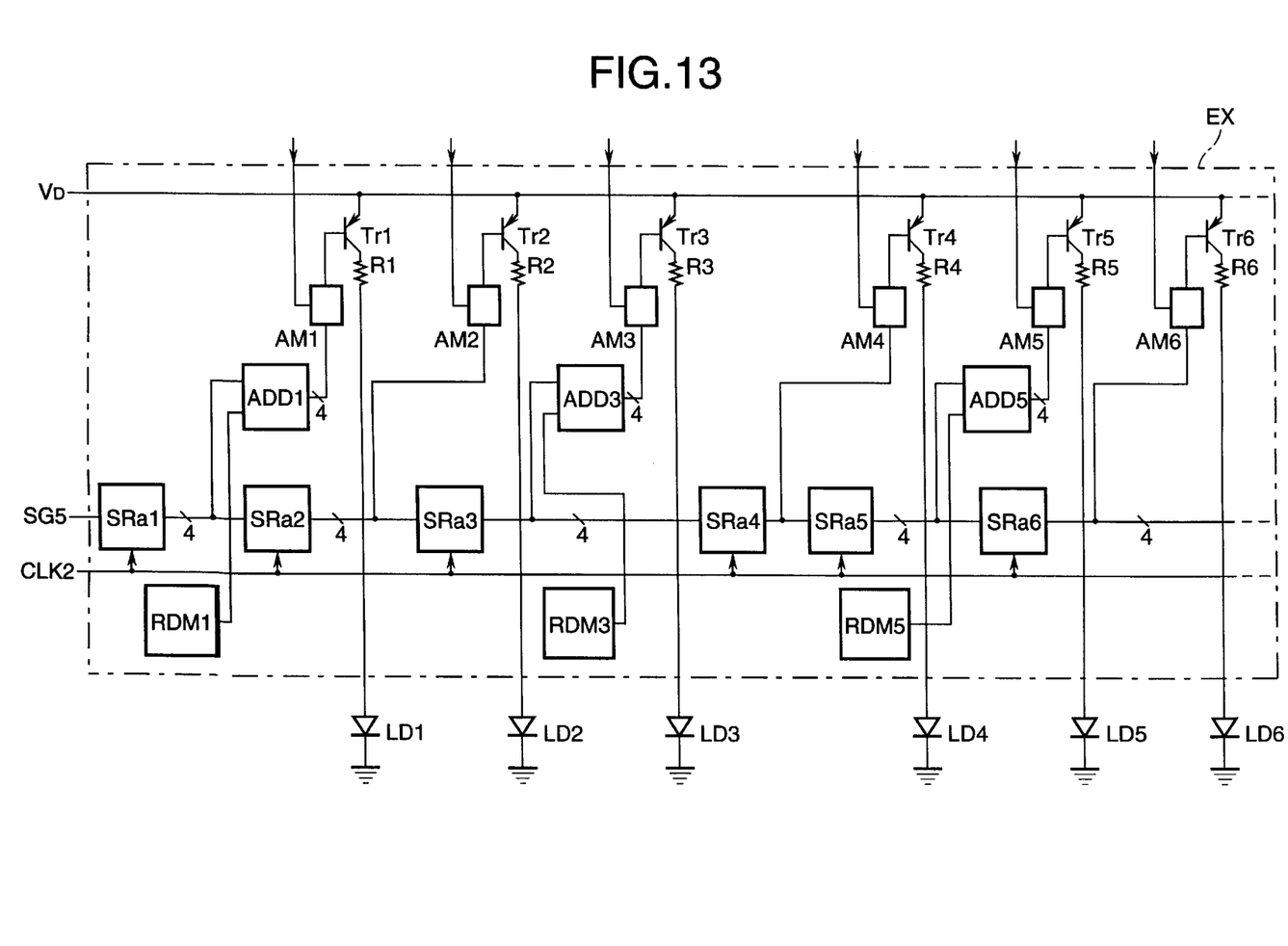
FIG. 13 illustrates random number generators provided for every other LEDs.

Alternatively, there may be provided only a limited number of random number generators RDM1, RDM3, RDM5, . . . , as shown in FIG. 13, so that one random number generator is provided for every other LEDs, thereby saving manufacturing cost as well as allowing the energy specifying data SG5 to be transferred at high speed.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A non-impact printer, comprising:
    a plurality of print elements;
    a driver, supplying drive energy to said plurality of print elements to drive said plurality of print elements in accordance with print data;
    a drive controller, producing drive energy randomizing data and providing the drive energy randomizing data to the driver, said drive energy randomizing data causing the drive energy to randomly change.

2. The non-impact printer according to claim 1, wherein said drive energy randomizing data is produced on the basis of energy specifying data determined in accordance with the characteristics of each of said plurality of print elements, and a value by which the drive energy is randomly changed.

3. The non-impact printer according to claim 2, wherein the drive energy randomizing data causes the drive energy to change over a first range wider than a second range in which the energy specifying data would cause the drive energy to change.

4. The non-impact printer according to claim 2, wherein the print data includes a plurality of lines of bits, said drive controller subjecting the energy specifying data for every one of the plurality of lines to random fluctuation to produce the drive energy randomizing data.

5. The non-impact printer according to claim 2, wherein the print data includes a plurality of lines of bits, said drive controller subjecting the energy specifying data for every predetermined number of ones of the plurality of lines to random fluctuation to produce the drive energy randomizing data.

6. The non-impact printer according to claim 2, wherein said drive controller includes:
    a non-volatile memory, storing the energy specifying data;
    a generator, generating the value by which the drive energy is randomly changed; and
    an adder adding the value by which the drive energy is randomly changed to the energy specifying data to produce the drive energy randomizing data.

7. The non-impact printer according to claim 2, wherein said driver includes a drive energy controller, said drive energy controller producing an amount of energy supplied to each of said plurality of print elements, the amount of energy for each print element being determined in accordance with the drive energy randomizing data.

8. The non-impact printer according to claim 7, wherein each of said plurality of print elements emits light having an intensity determined by the amount of energy provided in accordance with the drive energy randomizing data.

9. The non-impact printer according to claim 1, wherein said plurality of print elements are ink pressure chambers provided on a print head of an ink jet printer.

10. The non-impact printer according to claim 1, wherein said plurality of print elements are heat generating spots of a print head of a thermal printer.

11. A non-impact printer having a print head, wherein the print head includes a plurality of print elements driven in accordance with logical states of corresponding bits of print data, the non-impact printer comprising:
    a driver, selecting one of the plurality of print elements corresponding to one of the bits of print data and supplying drive energy to the selected print element;
    a drive controller, producing drive energy randomizing data and providing the drive energy randomizing data to the driver said drive energy randomizing data causing the drive energy to randomly change.

12. The non-impact printer according to claim 11, wherein said drive energy randomizing data is produced on the basis of energy specifying data determined in accordance with characteristics of each of said plurality of print elements, and a value by which the drive energy is randomly changed.

13. The non-impact printer according to claim 12, wherein said driver includes a drive energy controller, said drive energy controller producing an amount of energy supplied to each of said plurality of print elements, the amount of energy for each print element being determined in accordance with the drive energy randomizing data.

14. The non-impact printer according to claim 13 further including:
    a non-volatile memory storing the energy specifying data;
    a generator, generating the value by which the drive energy is randomly changed; and
    an adder adding the value by which the drive energy is randomly changed to the energy specifying data to produce the drive energy randomizing data.

15. The non-impact printer according to claim 14, wherein there are provided a plurality of generators and a plurality of adders, each of the generators generating the value by which the drive energy is randomly changed for a corresponding one of the print elements, each of the adders adding the value by which the drive energy is randomly changed to the energy specifying data for the corresponding one of the print elements to produce the drive energy randomizing data.

16. The non-impact printer according to claim 14, wherein there are provided a plurality of generators and a plurality of adders, each of the generators generating the value by which the drive energy is randomly changed for every predetermined number of ones of the plurality of print elements, each of the adders adding the value by which the drive energy is randomly changed to the energy specifying data for a corresponding one of the plurality of print elements to produce the drive energy randomizing data.

* * * * *